UNITED STATES PATENT OFFICE.

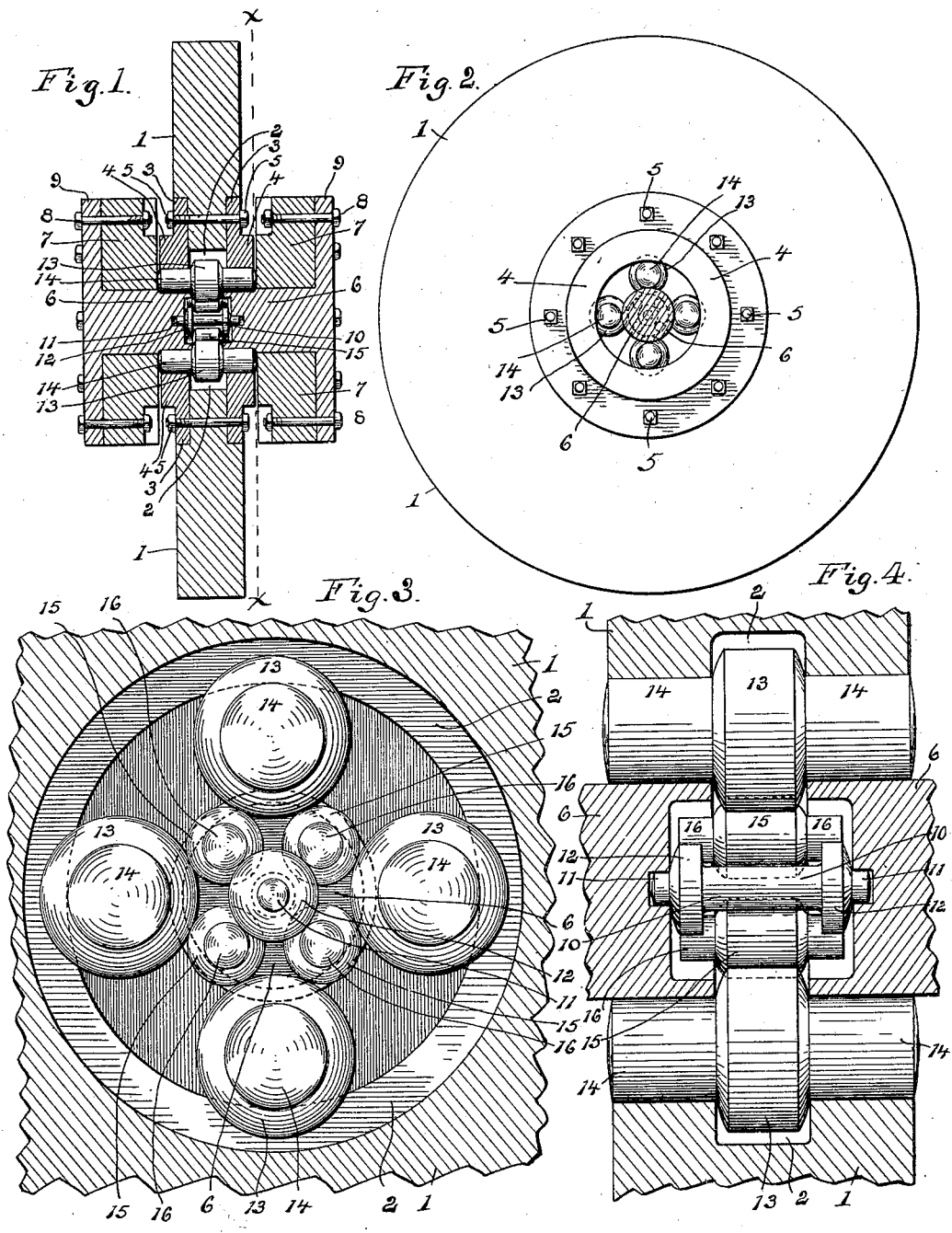

FRANCIS G. SUSEMIHL, OF DETROIT, MICHIGAN, ASSIGNOR OF ONE-FOURTH TO FRANK L. SUSEMIHL, OF CHICAGO, ILLINOIS.

ROLLER-BEARING.

No. 880,931.　　　　　Specification of Letters Patent.　　　　　Patented March 3, 1908.

Application filed October 26, 1907. Serial No. 399,246.

*To all whom it may concern:*

Be it known that I, FRANCIS G. SUSEMIHL, a citizen of the United States of America, residing at Detroit, in the county of Wayne and State of Michigan, have invented certain new and useful Improvements in Roller-Bearings, of which the following is a specification, reference being had therein to the accompanying drawings.

In roller bearings of ordinary construction, the friction rolls either contact with each other so that there are two surfaces traveling in opposite directions, or else are confined by spacing members or cages in which they are journaled, thereby introducing cylindrical bearings in the system. Furthermore these spacing rolls are usually grouped around or are external to the main shaft or axle, thereby increasing the size of the bearing as a whole and making it cumbersome. Because of this disposition of the rolls they must necessarily be kept as small as possible, which increases the friction and diminishes the readiness with which they revolve, and also makes them liable to crush when under heavy load.

This invention relates to a roller bearing wherein the spacing rolls are housed within the main shaft or axle and wherein the engagement between all the peripheral surfaces of the assembled bearing is a rolling contact with no slipping or retarding of any one surface in relation to its opposing surface, and wherein the members are of such size as to render the bearing capable of sustaining extremely heavy loads and moving freely thereunder.

The invention consists in the matters hereinafter set forth, and more particularly pointed out in the appended claims.

Referring to the drawings, Figure 1 is a view in section of a wheel and assembled bearing embodying features of the invention. Fig. 2 is a view in section on line *x—x* of Fig. 1. Fig. 3 is an enlarged view of the end of the bearing, with one part of the main shaft removed. Fig. 4 is an enlarged view taken in longitudinal section through the main shaft and wheel, showing a center spindle and bearing rollers in elevation and a modified form of hub.

As shown in the drawings, a wheel 1 having a body adapting it for any particular purpose desired, is provided with a hub whose bore has a centrally disposed peripheral channel 2. The hub may be conveniently constructed by securing two oppositely disposed collars 3 each with a central boss 4 having an aperture of less diameter than the hub bore, in counterbored seats on each side of the hub body by bolts 5 or other like means or the hub may be integral as illustrated in Fig. 4. A pair of axially alined stub shafts 6 which constitute the main shaft or axle of the bearing, are secured in axial alinement in the sides 7 of a suitable frame as by bolts 8 engaging flanges 9 on the outer ends of the stubs, with a space between their adjacent ends corresponding substantially to the width of the channel 2 or the distance between the collars 3.

The ends of the stub shafts are recessed or counterbored and a central spindle 10 which is journaled on end bearings 11 in axial sockets in the shafts, has a flange 12 near each end lying concentrically within the adjacent recess.

The wheel is rotatably mounted on a plurality of bearing rollers 13 whose reduced ends 14 act as journals interposed between the collars and the shafts in simultaneous contact therewith, and whose bodies are held in parallel spaced relation by a set of spacing rolls 15 whose central portions each contact simultaneously with a pair of the bearing rollers 13, and whose end journals 16 are interposed between the peripheries of the spindle flanges 12 and of the shaft recesses in simultaneous contact therewith. The shoulders between the bodies and journals of the respective rollers and on the outer sides of the flanges are preferably slightly beveled back or rounded to minimize any end thrust friction.

The ratios between the diameters of the contacting peripheries of the several elements of the assembled bearing are such that there is no slipping and that the bearing rollers are maintained in proper spaced relation without engagement with or confinement in a stationary cage. Furthermore all contacting peripheries travel on each other in the same direction so that there is no rubbing engagement as where the rollers of each set are not separated.

One feature of the device is its compactness, the placing of the spacing rolls within the main axle greatly reducing the diameter from that of the usual type of such bearings, while the rollers themselves may be of sufficient size to carry any desired load without making the assembled bearing cumbersome. Furthermore the arrangement minimizes the number of rollers necessary, the arrangement of four as illustrated being quite sufficient for ordinary purposes, although obviously they may be increased if desired. Again as each set of rollers revolves around the axle axis in the same direction, the bearing is started from rest very readily even under very heavy loads and there is no wedging or camming action between the parts.

Obviously the details of the hub construction and of the frame and of the method of securing the stub axles therein may be varied to suit different purposes, and I do not care to limit myself to any particular form or arrangement of parts.

What I claim as my invention is:—

1. A roller bearing comprising a main axle consisting of a pair of axially alined fixed stub shafts having cylindrically recessed and separated adjacent ends, a spindle journaled between the shafts in axial alinement therewith, a set of spacing rolls revoluble around the spindle within the shafts, a set of bearing rollers revoluble around the shafts maintained in separated parallel relation by the spacing rolls, and a hub rotatable on the bearing rollers.

2. A roller bearing comprising a main axle consisting of a pair of axially alined fixed stub shafts having cylindrically recessed and separated adjacent ends, a spindle journaled in axial sockets in the shafts having a flange near each end within the recess of the adjacent shaft, a set of spacing rolls whose end journals are interposed between the spindle flanges and encircling shafts in simultaneous contact therewith, a set of bearing rollers whose bodies revolve in spaced relation on the spacing rolls and whose end journals travel on the peripheries of the shafts, and a hub riding on the journals of the bearing rollers and clearing the bodies thereof.

3. A roller bearing comprising a main axle consisting of a pair of axially alined fixed stub shafts having cylindrically recessed and separated adjacent ends, a spindle journaled in axial sockets in the shaft ends and provided with flanges lying inside the shaft recesses, a set of spacing rolls revoluble around the spindle within the shafts in simultaneous contact with the spindle flange peripheries and the inner surfaces of the shaft recesses, a set of bearing rollers revoluble around the shafts maintained in separated parallel relation by the spacing rolls, and a hub rotatable on the bearing rollers.

4. A roller bearing comprising a main axle consisting of a pair of axially alined fixed stub shafts having counterbored and separated adjacent ends, a spindle journaled between the shafts in axial alinement therewith, a set of spacing rollers interposed between the spindle and the encircling shaft ends in simultaneous contact therewith, a set of bearing rollers whose bodies are adapted to revolve in spaced relation on the spacing rolls and whose end journals are adapted to travel on the peripheries of the shafts and a hub which rotates on the journals of the bearing rollers and clears the bodies thereof.

5. A roller bearing comprising a main axle consisting of a pair of axially alined fixed stub shafts having counterbored separated adjacent ends, a spindle journaled in axial sockets in the said shaft ends, spacing rolls revolving on the spindle whose end journals are in simultaneous contact with the spindle and the inner surfaces of the counterbores in the shaft, a hub having an inner channel, and bearing rollers whose bodies are held in spaced relation by the spacing rolls and maintained in proper longitudinal relation by the hub channel and whose end journals are interposed between the hub and the shafts in simultaneous rolling contact therewith.

6. A roller bearing comprising a main axle consisting of a pair of axially alined fixed stub shafts having cylindrically recessed, separated adjacent ends, a spindle rotatable in axial alinement between the shafts, a set of spacing rolls whose end journals are interposed between the spindle and encircling shafts and whose bodies lie between the shaft ends, bearing rollers whose end journals travel on the peripheries of the shafts and whose bodies contact with the spacing rolls between the shafts, and a hub rotatable on the journals of the bearing rollers provided with an inner channel affording clearance for the bearing roller bodies, each set of said spacing rolls and bearing rollers being adapted to maintain the bodies of the rollers of the contiguous set in definite spaced relation to each other, and the bodies of the said bearing rollers being adapted to lie between the annular end faces of the shafts and within the channel of the hub.

7. A roller bearing comprising a main axle consisting of a pair of axially alined fixed stub shafts having cylindrically recessed and separated adjacent ends, a hub encircling the shafts provided with an inner channel registering with the interval between the shaft ends, a set of bearing rollers whose end journals are in simultaneous contact with the peripheries of the shafts and the inner surfaces of the hub and whose bodies extend between the shaft ends and into the hub channel, spacing rolls within the shaft recesses whose bodies bear against the bodies of the bearing rollers and maintain them in parallel spaced relation, and a spindle in axial alinement with the ends of the shafts, provided with flanges within the recesses of the shafts adapted to bear against the journals of the spacing rolls and maintain them in rolling contact with the inner surfaces of the shaft recesses in spaced relation with each other.

8. A roller bearing comprising a main axle consisting of a pair of axially alined stub shafts whose adjacent separated ends are cylindrically counterbored, a set of spacing rolls having reduced end portions in rolling contact with the inner surfaces of the stub shafts, a set of bearing rollers having reduced end portions in rolling contact with the peripheries of the shafts whose bodies are in rolling contact with the peripheries of the spacing rolls, a hub rotating on the journal ends of the bearing rollers, and a spindle rotatable within the shafts bearing against the spacing roll ends adapted to maintain them in rolling contact with the inner surfaces of the shafts, the ratios between the diameters of the several pairs of contacting elements being such that the contacting peripheries of each pair have the same linear velocity.

9. A roller bearing comprising a pair of axially alined stub shafts having cylindrically recessed and separated adjacent ends, a set of spacing rolls, a freely rotatable spindle between the shafts adapted to hold said spacing rolls in rolling contact with the inner surfaces of the stub shafts in parallel spaced relation, a set of bearing rollers revoluble around the shafts maintained in parallel spaced relation by the spacing rolls, and a hub rotatable on the bearing rollers concentric with the shaft, the ratios between the diameters of the several pairs of contacting elements being such that contacting peripheries have the same linear velocity.

In testimony whereof I affix my signature in presence of two witnesses.

FRANCIS G. SUSEMIHL.

Witnesses:
  C. R. STICKNEY,
  ANNA M. DORR.